United States Patent [19]

Smith

[11] 3,746,447

[45] July 17, 1973

[54] MARKER ENLARGER

[75] Inventor: William E. Smith, Placentia, Calif.

[73] Assignee: California Computer Products, Inc., Anaheim, Calif.

[22] Filed: July 7, 1971

[21] Appl. No.: 160,310

[52] U.S. Cl. .......................... 355/84

[51] Int. Cl. .......................... G03b 27/10

[58] Field of Search .......................... 355/20, 43, 84; 346/108

[56] References Cited

UNITED STATES PATENTS

| | | | |
|---|---|---|---|
| 3,553,676 | 1/1971 | Raciti | 95/4.5 |
| 3,165,024 | 1/1965 | McClure | 355/20 |
| 3,287,559 | 11/1966 | Barnes | 346/108 X |

*Primary Examiner*—John M. Horan

*Attorney*—John A. Duffy and Bruce D. Jimerson

[57] ABSTRACT

A deflected laser beam can be used to generate a scanning raster for enlarging a moving marker. The enlargement factor perpendicular to the marker motion is dependent upon the geometry of the optics while the enlargement factor in the dimension parallel with the direction of motion depends upon the relative speed between the marker and copy material.

3 Claims, 1 Drawing Figure

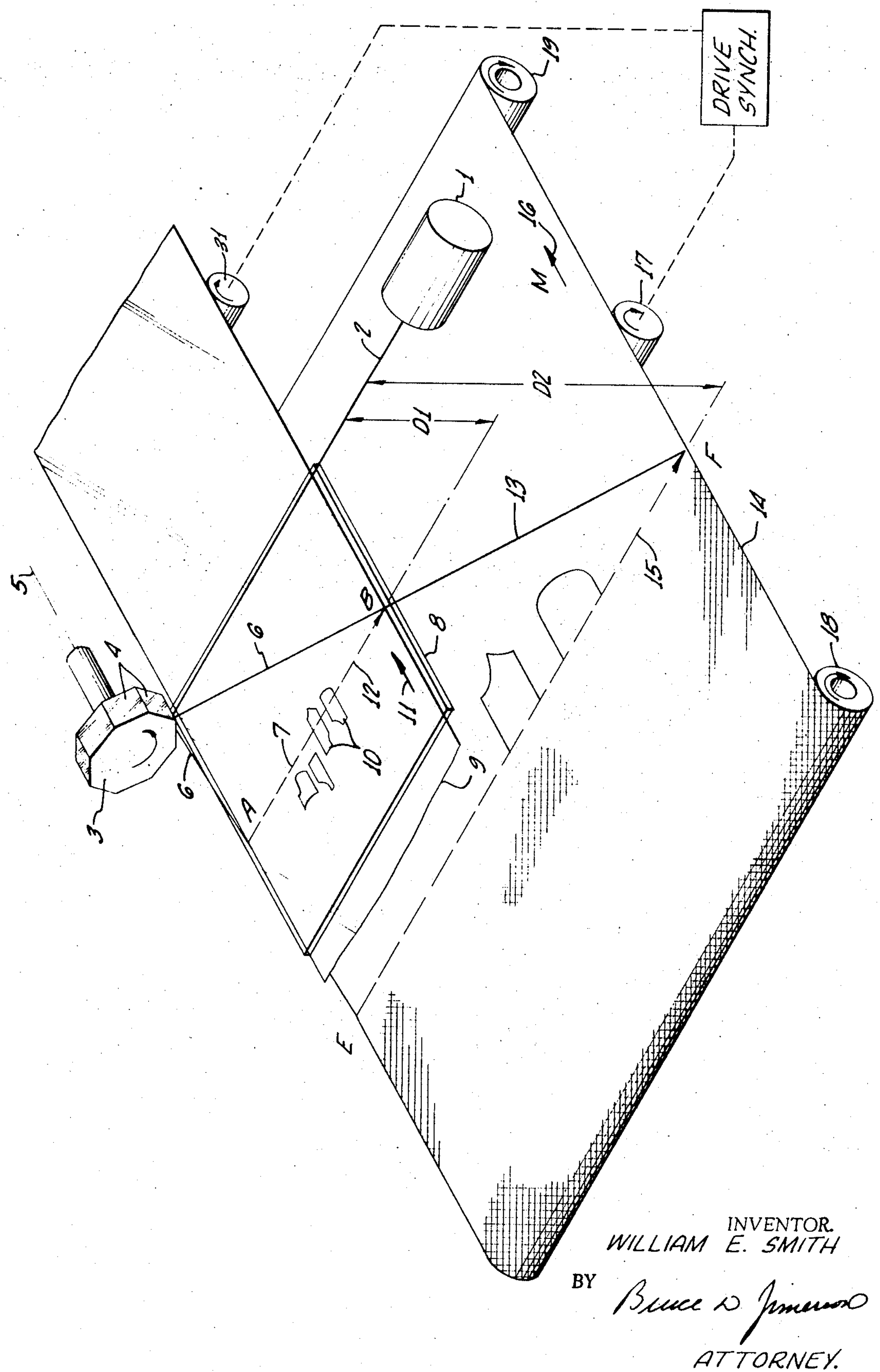
INVENTOR.
WILLIAM E. SMITH
BY Bruce D. Jimerson
ATTORNEY.

MARKER ENLARGER

BACKGROUND OF THE INVENTION

The proportional enlargement of graphical data is a frequent task in certain industries. In the apparel field for example, clothing patterns are often reduced to miniature scale to make miniature markers. These miniature markers must then be produced full scale for cutting. It is extremely advantageous to enlarge the entire miniature marker in one automatic operation - as opposed to manually tracing each piece using the miniature marker as a guide. Since the miniature marker itself is optimized in terms of minimizing the amount of material required, (See A System for Optimizing Material Utilization by H. W. Doyle, U.S. Pat. No. 3,596,068 issuing July 27, 1971), the enlarged copy of the marker is also optimized.

Accordingly, it is a primary object of the present invention to provide an apparatus for enlarging graphical data shapes.

It is another object of the present invention to provide a system for enlarging a marker.

It is a further object of the present invention to provide a laser scanning raster for enlarging graphical information presented on a moving surface.

Other objects and advantages of the present invention will be obvious from the detailed description of a preferred embodiment given herein below.

SUMMARY OF THE INVENTION

The aforementioned objects are realized by the present invention which comprises an arrangement for deflecting a light beam perpendicular to the movement of a transparent surface upon which data pieces have been previously arranged. The relative speed of motion between the copy material and the original layout determines the magnification in one dimension whereas the separation distance between the two determines the magnification in the other dimension.

DESCRIPTION OF THE DRAWING

The drawing shows the geometry and essential elements required to practice the invention.

DESCRIPTION OF A PREFERRED EMBODIMENT

Referring to the drawing, a preferred embodiment of the invention comprises a light source 1 for generating a narrow beam 2, a rotating mirror 3 having eight reflecting surfaces 4, a moveable transparent surface or belt 9 upon which miniature pattern pieces have been fastened or drawn so as to form a miniature marker 10, and a roll of sensitized copy material 14 which is driven by capstan 17 so as to maintain a synchronized velocity regardless of the diameter of material on the feed reel 18 or take up reel 19. The moveable transparent belt 9 rides on top of the transparent table 8 - and is driven by capstan 31 at a velocity which is synchronized with the velocity of the copy material. The axis of rotation 5 of the mirror 3 is perpendicular to the beam 2 and parallel to the surface 4 of the mirror 3.

In operation, the mirror 3 is rotated so that the miniature marker 10 is line scanned from position A to B on the surface of the transparent table 8. Both the transparent marker 10 and the copy material are moved in synchronous velocity with the mirror 3 as indicated by the arrows 11 and 16 respectively. The beam 13 emerges from the underside of the transparent table where it has not been interrupted by opaque areas of pieces which comprise the marker 10 - and impinges on the surface of the copy material 14 to record a line image 15 of the original line 7 between A and B. This scan line E-F on the copy material is longer than the original scan line A-B by the ratio of the perpendicular distance D2 from the copy material 14 to the mirror 3, divided by the perpendicular distance D1 from the layout surface 9 to the mirror 3. Thus, the transverse magnification $M_t$ is:

$$M_t = D2/D1$$

In a direction parallel to the motion 11 (or 16) the magnification is obtained by causing the copy material 14 to move at a speed $M_p$ times as fast as the layout 9 moves, i.e., $$M_p = V_c/V_1$$

Where $V_c$ is the velocity of the copy material and $V_1$ is the velocity of the layout material. For proportional enlargement $M_p$ will be made equal to $M_t$.

The pattern pieces may be line drawings on transparent material - or opaque patterns cut from paper or plastic. The light source is preferably a laser. Copy material which is heat or ultraviolet sensitive is preferable. In most cases it is highly desirable to optimize the placement of the pieces so as to minimize the amount of material utilized in creating the marker 10. A system for automatically performing this function has been previously referred to. In such a case, the copy will also be optimized - an extremely important result in the garment industry.

The basic teachings may be equally applied to numerous other fields which require enlargement of graphically displayed data. Blue prints, maps, and other information which could be recorded on transparent backing material can be enlarged using the apparatus of the present invention. Nor is magnification restricted to uniform enlargement in both dimensions, it being a simple matter to adjust the geometry or velocities so that $M_t \neq M_p$. Thus, although a preferred embodiment of the present invention has been shown and described, it will be understood that the invention is not limited thereto, and that numerous changes, modifications and substitutions may be made without departing from the spirit of the invention.

I claim:

1. An apparatus for producing enlarged copies comprising:
- a narrow beam light source;
- a moveable surface of copy material;
- a pattern positioned between said light source and said copy material;
- means for moving said pattern;
- means for moving said surface of copy material parallel to the direction of movement of said pattern;
- means for deflecting said light beam in a direction transverse to the direction of the movement of said copy material.

2. The apparatus recited in claim 1 including:
- means for varying the relative distances between said light source, pattern and copy material whereby transverse enlargement may be varied.

3. The apparatus recited in claim 2 wherein is included means for varying the relative velocity between said pattern and said copy material whereby longitudinal magnification may be changed.

* * * * *